(12) United States Patent
Elnajjar

(10) Patent No.: US 9,844,984 B2
(45) Date of Patent: Dec. 19, 2017

(54) VEHICLE TIRE GAUGE SYSTEMS

(71) Applicant: General Motors, LLC, Detroit, MI (US)

(72) Inventor: Hassan Elnajjar, Dearborn, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 168 days.

(21) Appl. No.: 14/720,292

(22) Filed: May 22, 2015

(65) Prior Publication Data

US 2016/0339750 A1    Nov. 24, 2016

(51) Int. Cl.
*B60C 23/00* (2006.01)
*B60C 23/04* (2006.01)

(52) U.S. Cl.
CPC ...... *B60C 23/0479* (2013.01); *B60C 23/0406* (2013.01)

(58) Field of Classification Search
CPC ............ B60C 23/0433; B60C 23/0401; B60C 23/0479; B60C 23/0455; B60C 23/0477; B60C 23/0435; B60C 23/0408; B60C 23/04; B60C 23/02; B60C 23/0406
USPC ........................................ 340/442–448, 5.72
See application file for complete search history.

(56) References Cited

U.S. PATENT DOCUMENTS

| | | | |
|---|---|---|---|
| 8,421,612 B2 | 4/2013 | Sugiura | |
| 8,493,177 B2* | 7/2013 | Flaherty | G05B 19/00 340/425.5 |
| 2001/0004236 A1* | 6/2001 | Letkomiller | B60C 23/0408 340/572.1 |
| 2006/0208865 A1 | 9/2006 | Quach et al. | |
| 2007/0038408 A1* | 2/2007 | Gaunt | B60C 23/001 702/138 |
| 2010/0085177 A1 | 4/2010 | Kochie et al. | |
| 2010/0152620 A1* | 6/2010 | Ramsay | A61B 5/0002 600/595 |
| 2014/0188348 A1 | 7/2014 | Gautama et al. | |
| 2014/0226010 A1* | 8/2014 | Molin | G06Q 10/06 348/148 |
| 2014/0256304 A1* | 9/2014 | Frye | H04W 4/206 455/418 |
| 2014/0266661 A1 | 9/2014 | Deniau et al. | |

* cited by examiner

*Primary Examiner* — Steven Lim
*Assistant Examiner* — Mancil Littlejohn, Jr.
(74) *Attorney, Agent, or Firm* — Harness, Dickey & Pierce, P.L.C.

(57) ABSTRACT

An example of a vehicle tire gauge system includes a tire pressure monitoring system in a vehicle. A transceiver in the vehicle is for transmitting a tire pressure sensed by the tire pressure monitoring system to a paired wearable device. A tire pressure table is stored in a model of an application having a view on the wearable device. A haptic feedback generator in the wearable device is responsive to the tire pressure reaching a first value, wherein the first value is contained in the tire pressure table.

21 Claims, 3 Drawing Sheets

US 9,844,984 B2

VEHICLE TIRE GAUGE SYSTEMS

TECHNICAL FIELD

The present disclosure relates generally to vehicle tire gauge systems.

BACKGROUND

Maintaining accurate tire pressure can improve vehicle performance in a variety of ways. As an example, accurate tire pressure may enhance vehicle handling, such as cornering, braking, and stability. As another example, accurate tire pressure may improve the ride comfort (e.g., fewer bumps, etc.). As other examples, accurate tire pressure may extend the tire life, and, in some instances, may increase the vehicle's gas mileage/fuel economy.

SUMMARY

An example of a vehicle tire gauge system includes a tire pressure monitoring system in a vehicle. A transceiver in the vehicle is for transmitting a tire pressure sensed by the tire pressure monitoring system to a paired wearable device. A tire pressure table is stored in a model of an application having a view on the wearable device. A haptic feedback generator in the wearable device is responsive to the tire pressure reaching a first value, wherein the first value is contained in the tire pressure table.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method and system disclosed herein enable a vehicle operator to utilize the in-vehicle systems in conjunction with a device wearable on his/her person as a tire pressure gauge. As such, a mechanical gauge is not needed. The in-vehicle systems transmit tire pressure data to the wearable device, which in conjunction with an external computing device, converts the tire pressure data into a haptic feedback effect. When a haptic feedback generator of the wearable device activates the haptic feedback effect, the wearable device imposes a force, vibration, tap, or other tactile feedback upon the vehicle operator wearing the wearable device. The haptic feedback effects inform the vehicle operator of a certain tire pressure condition (e.g., increasing pressure, placard value reached, etc.). The wearable device may also be programmed to provide tire pressure data in the form of visual feedback.

In the examples disclosed herein, it is to be understood that the wearable device may be a smart watch, smart helmet, smart bracelet, smart glasses, etc. As will be described in more detail, the wearable device is at least short range wireless communication enabled.

Figure 1:
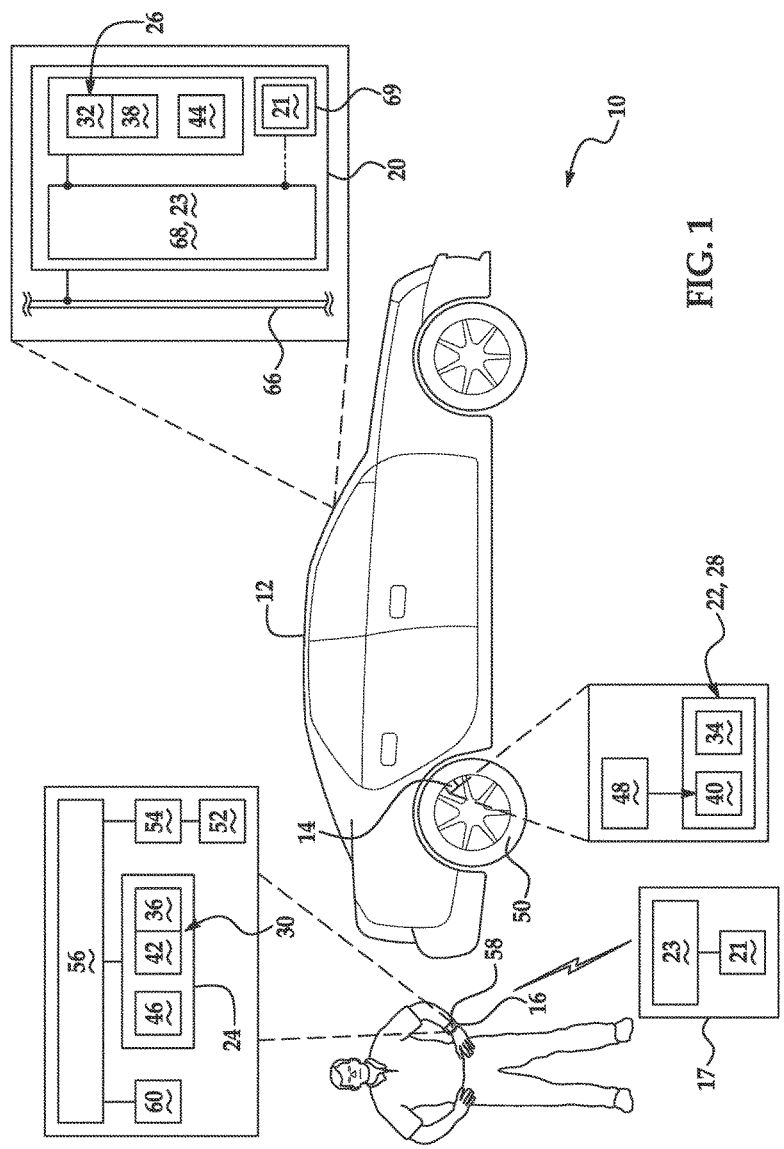
FIG. 1 is a schematic view of an example of a vehicle tire gauge system.

Referring now to FIG. 1, an example of the system 10 is depicted. The system 10 includes a vehicle 12, a tire pressure monitoring system 14 (TPMS) positioned in/on the vehicle 12, a wearable device 16, and a computing device 17 external to the wearable device 16. In the example shown in FIG. 1, each component 12, 14, 16, 17 is capable of communicating with one or more of the other components 12, 14, 16, 17 using short range wireless communications. In other examples, the vehicle 12 and the wearable device 16 may be equipped to communicate with one another over a wireless carrier/communication system 18 (shown and described further in reference to FIG. 3).

In the examples disclosed herein, a tire pressure application follows a model/view/controller design pattern. The model 21 contains the specific data (e.g., tire pressure data) and business logic for the application, the view 52 is an interface on the wearable device 16 that allows a user to view the data, and the controller 23 performs operations on the data. The view 52 visually provides data, information, options, etc. to the user of the wearable device 16, and also enables the user to interact with the application using swipes, gestures, taps, touches, tables, etc. The controller 23 is between the model 21 and the view 52, and acts as a dispatcher between two. More specifically, the controller 23 provides model data to the view 52, and interprets user actions (received at the view 52), such as button clicks. The controller 23 depends on the view 52 and the model 12. In the examples disclosed herein, the view 52 is part of the wearable device 16, and the model 21 and controller 23 are part of the external device 17.

In other instances, the wearable device 16 may contain the view 52, controller 23, and model 21. In these instances, the wearable device 16 is capable of storing the data, providing the interface, and performing operations on the data. In these instances, the data may be transmitted directly from the vehicle 12 to the wearable device 16, which functions in the same manner as the external device 17 described herein. In these instances then, the external device 17 is not needed, as the wearable device 16 can operate as the external device.

While the external device 17 is shown as its own entity in FIG. 1, it is to be understood that a mobile device (e.g., mobile phone 70 shown in FIG. 3) or part of a vehicle communications platform (VCP) 20 of the vehicle 12 can host the external device 17, including the controller 23 and the model 21. As such, for the tire pressure application, the mobile device 70 or the vehicle communications platform (VCP) 20 of the vehicle 12 may act as a server and the wearable device 16 may act as a thin client. In some instances, in addition to having access to the data contained in the model 21, the mobile device or the VCP 20 may also be in communication with a back-end system (e.g., components at center 72) to obtain additional vehicle data (e.g., historical tire pressure data, etc.) that is not contained in the model 21.

Short range wireless communications may be suitable for communication between, for example, the vehicle 12 and the TPMS 14, the vehicle 12 and the wearable device 16, the TPMS 14 and the wearable device 16, and the wearable device 16 and the computing device 17. Each of the vehicle 12, the TPMS 14, and the wearable device 16 includes a respective communications platform, referred to herein as the vehicle communications platform (VCP) 20, the TPMS communications platform (TPMSCP) 22, and the wearable device/smart watch communications platform (WDCP) 24.

Each of the communications platforms 20, 22, 24 is equipped with a respective transceiver 26, 28, 30 which is capable of short range wireless communications. Each transceiver 26, 28, 30 includes a respective signal emitter 32, 34, 36 for transmitting signals/data and a respective signal receiver 38, 40, 42 for receiving signals/data. The computing device 17 is also capable of sending and receiving data. When the computing device 17 is hosted by the vehicle 12, the computing device 17 may be implemented as the VCP 20. When the computing device 17 is hosted by the mobile device 70 (FIG. 3), the computing device 17 may be implemented as a communications platform 87 of the mobile device 70.

In some of the examples disclosed herein, the vehicle communications platform 20 is in short range wireless communication with the TPMS communications platform 22 and the wearable device/smart watch communications platform 24, and the TPMS communications platform 22 is also in short range wireless communication with the wearable device/smart watch communications platform 24. The communications platforms 20, 22, 24, and in particular, the transceivers 26, 28, 30, may communicate via any short range wireless communication technology, such as BLUETOOTH® and various classes thereof (e.g., BLUETOOTH® low energy (LE), BLUETOOTH® smart, etc.), dedicated short range communications (DSRC), or WI-FI™ and various classes thereof. When WI-FI™ and various classes thereof are utilized, the communications platforms 20, 22, 24 may also utilize a cellular adapter (e.g., shown as 44 in the VCP 20 and 46 in the WDCP 24).

Different short range wireless communication technologies are configured for different distances. For the communications between all of the communication platforms 20, 22, 24, relatively short distances are suitable. For example, when the communication platforms 20, 22, 24 are each configured for some BLUETOOTH® connections, they may have a preset wireless access range, or may have a standard range from about 10 meters (i.e., about 32 feet) to about 100 meters (i.e., about 330 feet).

It is to be understood that each of the communication platforms 20, 22, 24 has a unique identifying code (e.g., a wireless connection key) that is used to pair one of the communications platforms 20, 22, 24 with another of the communications platforms 20, 22, 24. Two of the communications platforms 20, 22, 24 are paired with each other when they exchange their unique identifying codes with each other. For example, the WDCP 24 and the TPMSCP 22 are paired when they exchange their unique identifying codes with each other. This enables the WDCP 24 and the TPMSCP 22 to communicate typically under a secured connection. As a more specific example, initial pairing may involve setting the wearable device 16 to a short range wireless discovery mode (such as by selecting, on the wearable device 16, a discovery mode function as a menu option, icon, or the like). While in the discovery mode, other devices configured for short range wireless communications (such as the TPMSCP 22 and/or the VCP 20) are allowed to detect the presence of the wearable device 16. When the TPMSCP 22 and/or the VCP 20 locates the wearable device 16, the wearable device 16 automatically provides the type of device it is (e.g., a smart watch, a helmet, etc.) and its short range wireless connection name. The wearable device 16 may then prompt the user to enter a security code/password, and then the unique identifying code of the wearable device 16 is sent to the TPMSCP 22 and/or the VCP 20. Upon receiving the unique identifying code, the TPMSCP 22 and/or the VCP 20 sends its own unique identifying code to the wearable device 16 to ultimately pair the two devices 16 and 22 or 16 and 20 together. The TPMSCP 22 and the VCP 20 may be initially paired in a similar manner.

Figure 3:
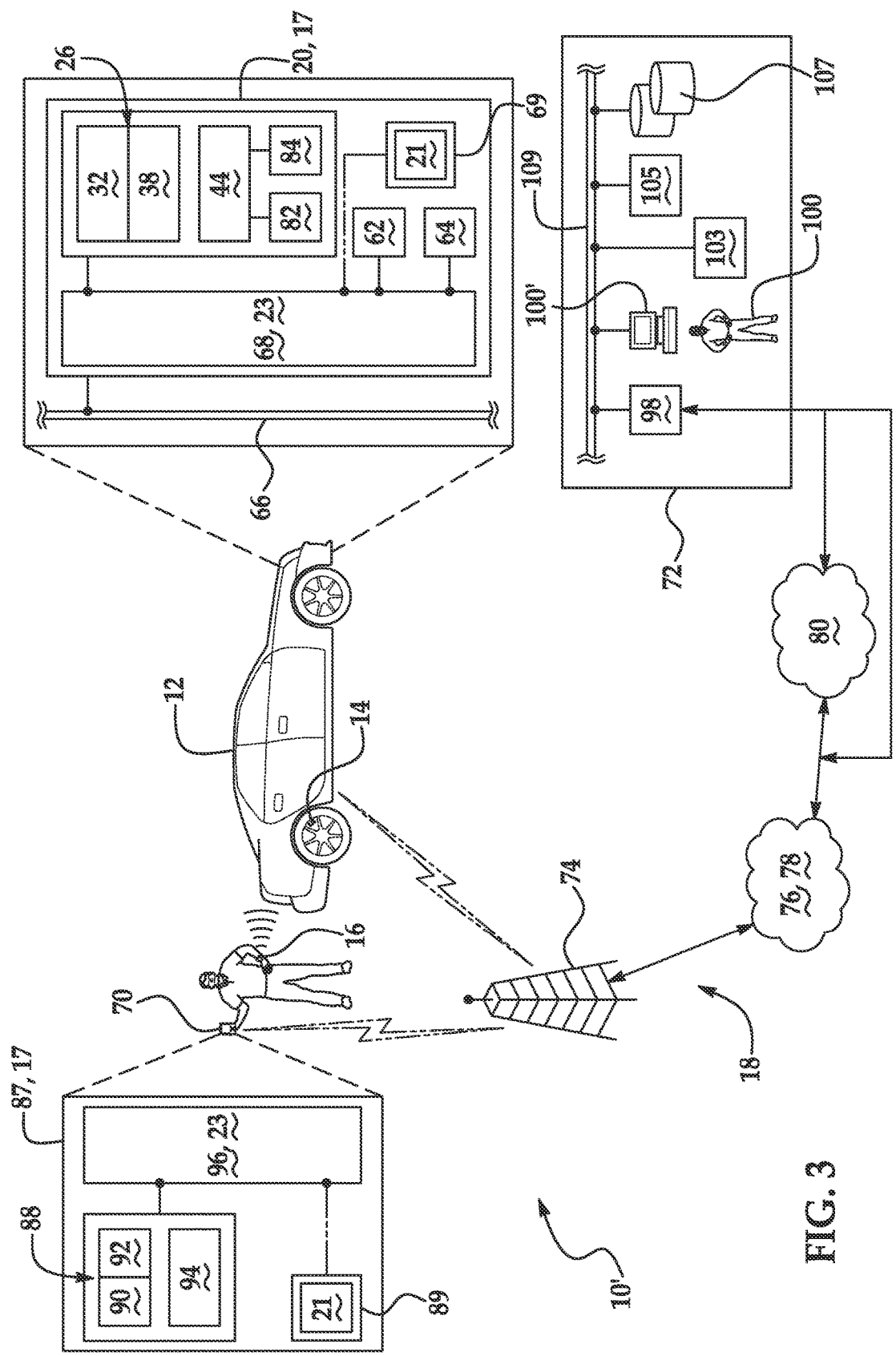
FIG. 3 is a schematic view of another example of the vehicle tire gauge system.

Referring briefly to FIG. 3, in examples including the mobile device 70, it is to be understood that the computing device 17 is part of the mobile device communications platform (MDCP) 87. As depicted in FIG. 3, the MDCP 87 includes communication component(s) that is/are capable of short range wireless communications with the VCP 20 and with the WDCP 24. In particular, the mobile device 70 may be equipped with a transceiver 88 which is capable of short range wireless communications. The mobile device transceiver 88 includes a respective signal emitter 90 for transmitting signals/data and a respective signal receiver 92 for receiving signals data. In some examples, the VCP 20 transmits the tire pressure data to the receiver 92, and the emitter 90 transmits the tire pressure data to the wearable device 16.

Once the communications platforms 20 (17), 22 and/or 20 (17), 24 and/or 22, 24, and/or 87 (17), 20 and/or 87 (17), 24 have been paired and whenever within short range wireless communication range of each other, the communications platforms 20, 22 and/or 20, 24 and/or 22, 24 and/or 87 (17), 20 and/or 87 (17), 24 can directly communicate with one another. These short range wireless communications are utilized in the example of the method 100 shown in FIG. 2. The method 100, as well as other system 10 components, will be described in further detail in reference to FIGS. 1 and 2. Throughout the discussion of the method 100, it is to be understood that the communications platforms 20, 22 and/or 20, 24 and/or 22, 24 have been paired with one another, and that the computing device 17 is implemented in the vehicle 12.

Figure 2:
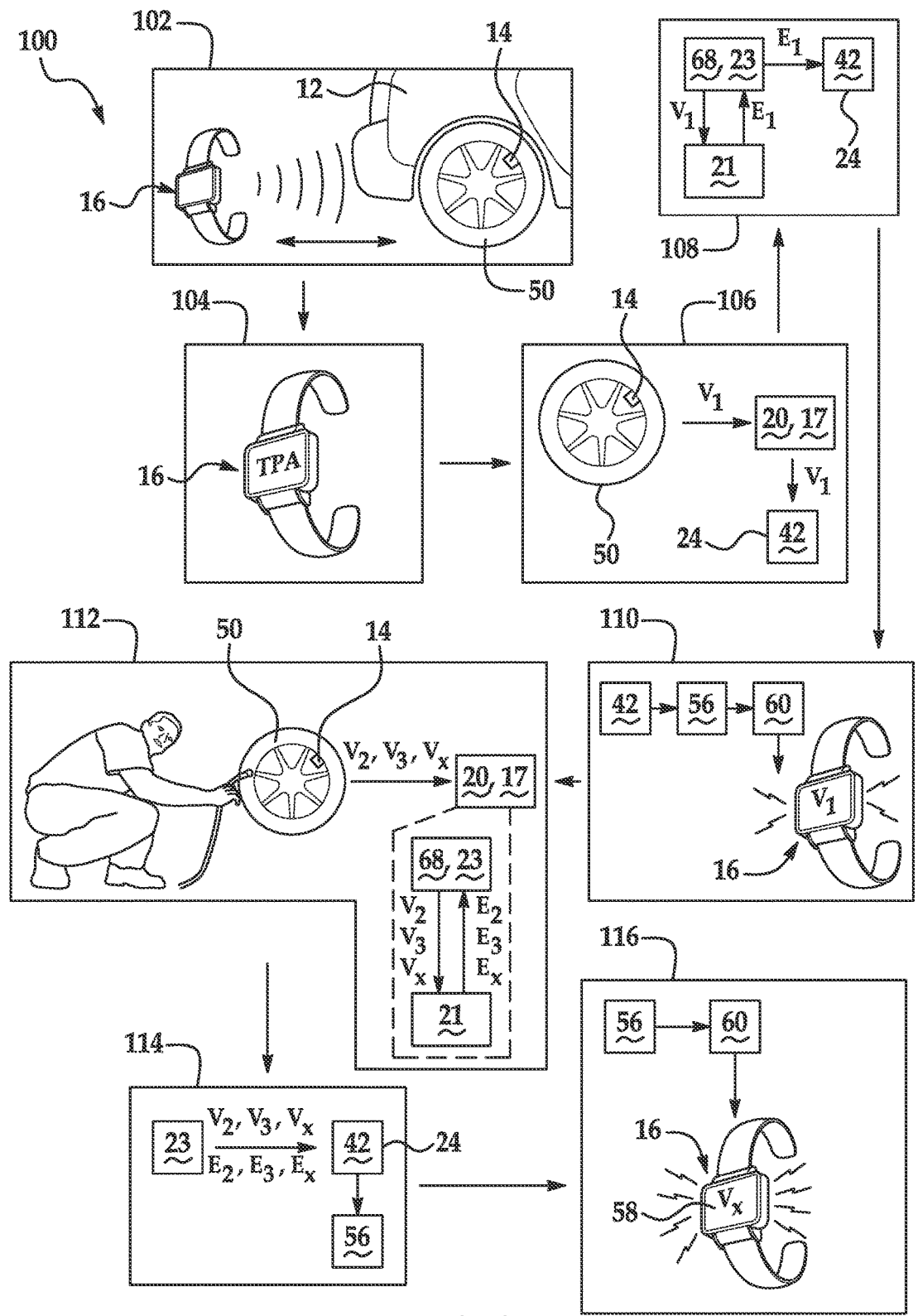
FIG. 2 is a flow diagram illustrating an example of a vehicle tire gauge method.

As shown at reference numeral 102 of FIG. 2, the method 100 includes the TPMS 14 and the wearable device 16 (in this example, a smart watch) recognizing that they are within the short range wireless communication range of one another. Multiple events are triggered when the TPMS 14 and the wearable device 16 (in this example, a smart watch) recognize that they are within the short range wireless communication range of one another. As shown at reference numeral 104, the wearable device 16 launches the view 52 of the tire pressure application that is resident on an electronic memory 54 of the wearable device 16. As shown at reference numeral 106, the TPMS 14 collects a then-current tire pressure (e.g., first value $V_1$) of a tire 50.

When the wearable device 16 launches the view 52 of the tire pressure application (reference numeral 104), the wearable device 16 is able to display the received tire pressure data using the view 52. The wearable device 16, through a microprocessor 56, a haptic generator 60, and the external computing device 17, is also able to generate haptic feedback effect(s) in response to the received tire pressure data. These functions will be described in further detail below.

When the TPMS 14 collects the then-current tire pressure $V_1$ of the tire 50, the TMPS 14 utilizes its pressure sensing element 48. As shown in both FIGS. 1 and 2 (e.g., at reference numeral 102), the TPMS 14 (including the pressure sensing element 48 and the TPMSCP 22) is mounted in or on the tire 50 of the vehicle 12. The pressure sensing element 48 may be a sensor that physically measures the tire pressure in the tire 50. The pressure sensing element 48 may also be configured with an element that measures and reports the temperature of the tire 50 as well.

The pressure sensing element 48 reports the collected/measured tire pressure data to the TPMS signal receiver 40.

The TPMS signal receiver 40, in turn, transmits the collected tire pressure data to the TPMS signal emitter 34, which then emits the collected tire pressure data to the VCP 20. The TPMS 14 may have a unique identification number or name that is transmitted with the tire pressure data so that the VCP 20 can identify which tire 50 of the vehicle 12 the received tire pressure data is associated with. As such, if the tires (including tire 50) of the vehicle 12 are rotated, the VCP 20 can still identify which tire 50 the received tire pressure data is associated with.

In one example, the VCP 20 receives the tire pressure data from the signal emitter 34 from the TPMS 14 through the signal receiver 38. Generally, the signal receiver 38 acts as a temporary repository for the received signals (indicative of tire/air pressure and/or tire temperature data), until such data is pulled from or pushed to an electronic memory that stores the model 21.

As shown in FIG. 1, the signal receiver 38 may be in operative communication with a vehicle bus 66. The vehicle bus may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 66 enables the vehicle 12 to send signals (e.g., real-time bus messages, alert notifications) from the VCP 20 to various units of equipment and systems both outside the vehicle 12 and within the vehicle 12. The vehicle bus system 66 also enables the vehicle 12 to receive signals at the VCP 20 from various units of equipment and systems both outside the vehicle 12 and within the vehicle 12.

As shown at reference numeral 106 of FIG. 1, the VCP 20 transmits the then-current tire pressure data $V_1$ to the signal receiver 42 of WDCP 24 of the paired wearable device 16. When tire pressure data $V_1$ is received by the wearable device 16, the view 52 of the wearable device 16 is triggered to display the tire pressure data $V_1$ (in the form of a visual representation) on the display 58 of the wearable device 16.

In this example, the VCP 20 is the external device 17, and thus a processor 68 of the VCP 20 is the controller 23 and an electronic memory 69 of the VCP 20 stores the model 21. The controller 23/processor 68 may be a micro controller, a controller, a host processor, and/or an application specific integrated circuit (ASIC). The electronic memory 69 of the VCP 20 may be an encrypted memory that is configured to store i) the model 21, ii) computer readable instructions/code to be executed by the controller 23/processor 68, and the like. The electronic memory 69 may be a non-transitory, tangible computer readable media (e.g., RAM).

At reference numeral 108 in FIG. 2, upon receiving the then-current tire pressure data $V_1$, the controller 23/processor 68 is programmed to utilize the model 21 to identify a haptic feedback effect which, when implemented by the wearable device 16, will tactilely inform the wearer of the device 16 of the then-current tire pressure data $V_1$.

The controller 23/processor 68 may access a haptic library or a tire pressure table of the model 21 stored in the memory 69 in order to identify the haptic feedback effect. The haptic library or tire pressure table may include tire pressure conditions that are linked to tire pressure value(s)/data, and haptic feedback effects that are linked to particular tire pressure conditions.

The tire pressure conditions may include the placard tire pressure value, tire pressure values above the placard tire pressure value, and tire pressure values below the placard tire pressure value. The tire pressure conditions may also include a temperature that is associated with the particular tire pressure value (e.g., cold weather or hot weather temperature). In an example, each tire pressure value is considered a tire pressure condition and is linked to a different haptic feedback effect. In another example, the tire pressure values may be grouped together as a single condition, and the group may be linked to a single haptic feedback effect. As examples, tire pressure values ranging from 1 PSI to 5 PSI below the placard tire pressure value may be linked to one haptic feedback effect, tire pressure values ranging from 6 PSI to 10 PSI below the placard tire pressure value may be linked to another haptic feedback effect, and tire pressure values ranging from 11 PSI to 15 PSI below the placard tire pressure value may be linked to still another haptic feedback effect. Similar groups may be assigned to tire pressure values above the placard tire pressure value.

Each haptic feedback effect that is stored in the haptic library may be different, so that each haptic feedback effect identifies a different tire pressure condition. Examples of the haptic feedback effect include forces, vibrations, taps, or other tactile actions. The haptic feedback effect may vary by increasing or decreasing the strength of the force, vibration, etc. and/or by performing the force, vibration, etc. in a pulsating, tapping, or continuous manner. For example, a mild continuous vibration may be linked to the group including tire pressure values ranging from 11 PSI to 15 PSI below the placard tire pressure value and the strength of the continuous vibration may for each group as the tire pressure value approaches the placard tire pressure value. In this example, the placard tire pressure value may be linked to a strong, pulsating vibration so that the user of the wearable device 16 is aware that the placard tire pressure value has been reached.

The controller 23/processor 68 is programmed to utilize the received tire pressure data/value $V_1$ as a query in the library or data table of the model 21. As noted above, the tire pressure data/value $V_1$ may be contained in the library or data table as an individual tire pressure condition or as part of a group of values associated with a single tire pressure condition. Using the tire pressure data/value $V_1$, the controller 23/processor 68 is programmed to identify the tire pressure condition that is linked to/associated with the received tire pressure data/value $V_1$, and to identify the haptic feedback effect $E_1$ linked to/associated with the identified tire pressure condition.

The controller 23/processor 68 then initiates the transmission of the identified haptic feedback effect $E_1$ to the WDCP 24. In an example, the controller 23/processor 68 utilizes the signal emitter 32 of the VCP 20 to transmit the haptic feedback effect $E_1$ to the signal receiver 42 of the wearable device 16.

As shown at reference numeral 110, the haptic feedback effect $E_1$ is received by the signal receiver 42, which transmits the effect $E_1$ to the microprocessor 56 of the wearable device 16. The microprocessor 56 is operatively connected to the WDCP 24, the electronic memory 54 (and thus the view 52), and the haptic generator 60. The microprocessor 56 may be any suitable microprocessor or microcontroller.

Based upon the received haptic feedback effect $E_1$, the microprocessor 56 of the wearable device 16 generates an appropriate haptic command signal that will indicate to the haptic generator 60 which haptic feedback effect $E_1$ is to be generated. The microprocessor 56 then transmits the haptic command signal to the haptic generator 60 for implementation of the haptic feedback effect $E_1$. The generation of the haptic feedback is also shown at reference numeral 110 of FIG. 2.

The haptic generator 60 includes a haptic feedback function that is responsive to the haptic command signal. When the haptic generator 60 receives the haptic command signal from the microprocessor 56, the haptic feedback function is programmed to recognize the received command and to initiate a haptic material to perform the haptic feedback effect $E_1$ that is associated with the haptic command signal. The haptic material may be selected from the group consisting of a piezoelectric material (e.g., crystals and/or ceramics), a shape memory alloy or polymer, an eccentric rotating mass, and a linear resonant actuator (which include a small motor, a wave spring, and a moving mass). The haptic feedback function may initiate the haptic material by applying a voltage potential, heat, or some other appropriate stimulus that will activate the haptic material. When the haptic material performs the haptic feedback effect, the wearable device 16 moves, vibrates, or the like, thereby provide tactile feedback to the user that is indicative of the current tire pressure value. The vibration is shown schematically at reference numeral 110 of FIG. 2.

It is to be understood that the controller 23/processor 68 is programmed to dynamically generate updated haptic command effects $E_2$, $E_3$, $E_x$ as new tire pressure values/data are received (e.g., when the tire 50 is being filled), and the microprocessor 56 is programmed to dynamically generate updated haptic command signals as new haptic command effects $E_2$, $E_3$, $E_x$ are received. The haptic feedback function of the haptic generator 60 is programmed to dynamically implement the updated haptic feedback effects $E_2$, $E_3$, E, as new/updated haptic command signals are generated.

In the example shown in FIG. 2, after the tire pressure data/value $V_1$ is received and utilized to identify and provide the haptic feedback effect $E_1$, the user may decide to perform a tire filling event. This is shown at reference numeral 112 of FIG. 2.

As the user adds air to the tire 50, updated tire pressure values/data $V_2$, $V_3$, $V_X$ are transmitted to the VCP 20. It is to be understood that tire pressure value, $V_x$, X is any integer, and is associated with the last tire pressure value sensed by the pressure sensing element 48 and transmitted to the wearable device 16 during a single tire filling event.

As the VCP 20 receives the updated tire pressure values/data $V_2$, $V_3$, $V_x$, the controller 23/processor 68 is programmed to utilize the model 21 (e.g., haptic library and/or data table) to identify haptic feedback effects $E_2$, $E_3$, $E_x$ for each of the updated tire pressure values/data $V_2$, $V_3$, $V_x$, as shown at reference numeral 112.

As the haptic feedback effects $E_2$, $E_3$, $E_x$ are dynamically identified, the controller 23/processor 68 transmits the updated tire pressure values/data $V_2$, $V_3$, $V_x$ and the updated haptic feedback effects $E_2$, $E_3$, $E_x$ to the WDCP 24 of the paired wearable device 16. The WDCP 24 transmits the received information to the microprocessor 56 of the wearable device 16. This is shown at reference numeral 114 of FIG. 2.

Upon receiving the updated haptic feedback effects $E_2$, $E_3$, $E_x$, the microprocessor 56 generates an appropriate haptic command signal that will indicate to the haptic generator 60 which haptic feedback effect $E_2$, $E_3$, $E_x$ is to be generated. The microprocessor 56 then transmits the haptic command signal to the haptic generator 60 for implementation of the haptic feedback effect $E_2$, $E_3$, $E_x$. Each of the haptic feedback effects tactilely informs the wearer of the device 16 of the then-current tire pressure data $V_2$, $V_3$, $V_x$, and also when the placard tire pressure value has been reached.

As an example, if the first value $V_1$ is 15 PSI below the placard tire pressure value, the haptic feedback effect $E_2$, $E_3$, $E_x$ (shown at reference numeral 110) may be a mild, continuous vibration. As the user fills the tire (reference numeral 112) and updated tire pressure values/data $V_2$, $V_3$, $V_x$ are received indicating that the PSI is rising, the haptic feedback effect $E_2$, $E_3$, $E_x$ may change (e.g., the continuous vibration may increase, become spaced apart, etc. with each value $V_2$, $V_3$, $V_x$ or when the $V_2$, $V_3$, $V_x$ indicates that a new condition has been reached) to indicate to the user that the tire pressure is increasing. When the tire pressure value $V_x$ indicates to the controller 23/processor 68 that the placard tire pressure value has been reached, the vibration of the wearable device 16 may be a strong, continuous vibration or some other varied tactile effect that notifies the user that the placard tire pressure value has been reached. The increased vibration of the wearable device 16 in this example is identified at reference numeral 116.

As illustrated at reference numeral 116, the wearable device 16 may also display the then-current tire pressure value $V_2$, $V_3$, $V_x$ on the display 58. While not shown, the pressure of all of the vehicle tires 50 may be shown simultaneously.

The controller 32 of the tire pressure application may be programmed to generate trends and/or a history of the tire pressure data for each tire 50. The controller 32 may utilize the model 21 and/or may retrieve historical vehicle data from another source (e.g., center 72) in order to generate trends and/or the history, and may transmit the trends and/or the history for display view the view 52.

The examples shown in FIGS. 1 and 2 are directed to the direct communication between the VCP 20 (which implements the external computing device 17) and the WDCP 24. In other examples, the communication between the VCP 20 and the WDCP 24 may be indirect. In these examples, the communications may be sent through a mobile device 70 and/or a center 72 that provides back end services to the vehicle 12. In one example, the MDCP 87 (as opposed to the VCP 20) implements the external computing device 17, and thus the controller 23/processor 96 of the MDCP 87 is programmed to work with the model 21 (on an electronic memory 89 of the mobile device 70) and with the view 52 of the wearable device 17 to provide the haptic feedback. In another example, the VCP 20 implements the external computing device 17 (as described in reference to FIG. 2), except that in this example any data is transmitted from the VCP 20 to the center 72, and then to the wearable device 16. An example of the system 10' utilizing these additional components is shown in FIG. 3.

In this example system 10', the wearable device 16 is paired with the TPMS 14, and the TPMS 14 is paired with the VCP 20. When the wearable device 16 is within the short range wireless communication capability of the TPMS 14, the wearable device 16 launches the view 52 of its tire pressure application and the TPMS 14 transmits the then-current tire pressure data to the VCP 20.

In the system 10' shown in FIG. 3, the VCP 20 communicates indirectly with the wearable device 16. The VCP 20 utilizes the mobile phone 70 of the wearable device user or the center 72 associated with the vehicle 12 as an information conduit. In one example, the VCP 20 transmits the tire pressure data/value(s) to the mobile phone 70, which then identifies the haptic feedback effect linked to the data/value(s) (e.g., via controller 23/processor 96 and model 21) and transmits the identified haptic feedback effect information to the wearable device 16. In this example, the microprocessor 56 of the wearable device 16 ultimately receives the identified haptic feedback effect and generates an appropriate haptic feedback signal, which is implemented by the haptic generator 60. In another example, the VCP 20 identifies the haptic feedback effect linked to the data/value(s) (e.g., via controller 23/processor 68 and model 21) and transmits the identified haptic feedback effect to the center 72, which then transmits the information to the wearable device 16. In this example, the microprocessor 56 of the wearable device 16 ultimately receives the identified haptic feedback effect and generates an appropriate haptic feedback signal, which is implemented by the haptic generator 60.

The communication between the VCP 20 and the mobile device 70 and between the mobile device 70 and the wearable device 16 may be accomplished using short range wireless technology, or using the wireless carrier/communication system 18. The technology used may depend, at least in part, on the distance between the mobile device 70 and each of the VCP 20 and the wearable device 16. The communication between the VCP 20 and the center 72 and between the center 72 and the wearable device 16 may be accomplished using the wireless carrier/communication system 18. As such, in at least some of the examples shown in FIG. 3, the wearable device 16 includes the cellular adapter 44 (including a cellular chipset/component for voice communications and a data transmission system for data transmission, examples of which are described below in reference to the mobile device 70).

Phone calls and/or messages (e.g., messages with tire pressure data/value(s), etc.) may be transmitted to, from, and/or between the VCP 20, communication component(s) of the mobile device 70, and/or communication component(s) of the center 72 using the carrier/communication system 18. Some of the communication links between the various components are shown as lightning bolts and arrows in FIG. 3.

In an example, the carrier/communication system 18 is a two-way radio frequency (RF) communication system. The carrier/communication system 18 may include one or more cell towers 74 or satellites (not shown). It is to be understood that the carrier/communication system 18 may also include one or more base stations and/or mobile switching centers (MSCs) 76 (e.g., for a 2G/3G network), one or more evolved Node Bs (eNodeB) and evolved packet cores (EPC) 78 (for a 4G (LTE) network), and/or one or more land networks 80. The carrier/communication system 18 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 18 may be GSM (global system for mobile telecommunications), CDMA2000, UMTS (universal mobile telecommunications system), LTE (long-term evolution), or some other available architecture.

An Internet connection may also be utilized for the transmission of the message(s), data, etc. The transmission of the messages, data, etc. may be made using the carrier/communication system 18, either through the vehicle's Internet connection (e.g., when the vehicle 12 is equipped with a 4G long-term evolution, LTE, or other suitable Internet connection) or through the mobile device's cellular and Internet connection.

Some vehicle communications utilize radio or satellite transmissions to establish a voice channel with the carrier/communication system 18 such that both voice and data transmissions may be sent and received over the voice channel. In some instances, vehicle communications are enabled through the VCP 20 via the cellular adapter 44 (also shown in FIG. 1), which includes a cellular chipset/component 82 for voice communications and a data transmission system 84 for data transmission.

The cellular chipset/component 82 of the cellular adapter 44 of the VCP 20 may be an analog, digital, dual-mode, dual-band, multi-mode and/or multi-band wireless transceiver. The cellular chipset-component 82 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system 84 may include a packet builder, which is programmed to make decisions about what packet to send (e.g., bandwidth, data to include, etc.) and to actually build a packet data message. In another example, the data transmission system 84 may include a wireless modem, which applies some type of encoding or modulation to convert the digital data so that it can communicate through a vocoder or speech codec incorporated in the cellular chipset/component 82. It is to be understood that any suitable encoding or modulation technique that provides an acceptable data rate and bit error may be used with the examples disclosed herein. While examples have been provided, it is to be understood that any suitable data transmission system 84 may be used.

The VCP 20 (as shown in FIG. 1 or FIG. 3) may also include other components, such as, for example, a location detection unit 62 and a real-time clock 64.

The location detection unit 62 may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection unit 62 may also include, for example, Glonass (i.e., global navigation satellite system), Sbas (i.e., satellite-based augmentation systems), or a D-GPS (differential global positioning system). The location detection chipset/component 62 may or may not be part of an in-vehicle navigation unit.

The real-time clock (RTC) 64 provides accurate date and time information to the VCP 20 hardware and software components that may require and/or request date and time information. In an example, the RTC 64 may provide time and/or date information for the tire pressure data that is transmitted from the VCP 20.

As mentioned above, in one example shown in FIG. 3, the mobile device 70 receives the tire pressure data from the VCP 20. The mobile device 70 may be a smart phone, such as a GSM/LTE phone or a GSM/CDMA/LTE phone, or a tablet computer. The mobile device 70 includes physical hardware (e.g., the processor 96) and computer readable instructions and/or data (e.g., model 21) stored in an electronic memory 89.

As described above, the mobile device communications platform 87 includes the transceiver 88. As shown in FIG. 3, the mobile device communication platform 87 may also include a cellular adapter 94, which includes a cellular chipset/component for voice communications and a data transmission unit for data transmission. In these examples, the VCP 20 transmits the tire pressure data to the cellular adapter 94 or to the signal receiver 92. When the cellular adapter 94 is utilized, the transmissions are made using the wireless carrier/communication system 18.

In this example, the mobile device 70 includes the computing device 17 of the tire pressure application. Upon receiving tire pressure values/data $V_1$, $V_2$, $V_3$, $V_x$, the controller 23/processor 96 is programmed to utilize the model 21 (e.g., haptic library and/or data table) to identify haptic feedback effects $E_1$, $E_2$, $E_3$, $E_x$ for each of the tire pressure values/data $V_1$, $V_2$, $V_3$, $V_x$. As the haptic feedback effects $E_1$, $E_2$, $E_3$, $E_x$ are dynamically identified, the controller 23/processor 96 transmits the tire pressure values/data $V_1$, $V_2$, $V_3$, $V_x$ and the haptic feedback effects $E_1$, $E_2$, $E_3$, $E_x$ to the WDCP 24 of the paired wearable device 16. The WDCP 24 transmits the received information to the microprocessor 56 of the wearable device 16, which generates the appropriate haptic command signal and transits the command signal to the haptic generator 60 for implementation.

Also as mentioned above, in another example shown in FIG. 3, the center 72 receives the tire pressure data and the identified haptic feedback effects from the VCP 20. As such, the VCP 20 implements the controller 23 and the model 21 of the application, and utilizes the center 72 as a conduit for the data. The center 72 may be a call center or other service center that provides services to the vehicle 12, both alone and in conjunction with the VCP 20 and other in-vehicle systems.

The center 72 may include switch(es) 98. The switch 98 may be a private branch exchange (PBX) switch. The switch 98 routes incoming signals so that voice transmissions are usually sent to either a live advisor 100 or the automated response system 100', and data transmissions are passed on to a modem or other piece of equipment (e.g., a communications module 103) for demodulation and further signal processing. The modem preferably includes an encoder, as previously explained, and can be connected to various devices, such as a processor 105 and a database 107.

The call center processor 105, which is often used in conjunction with telecommunication and computer equipment (not shown), is generally equipped with suitable software and/or programs enabling the processor 105 to accomplish a variety of center functions. Further, the various operations of the center 72 may be carried out by one or more computers (e.g., computer equipment) programmed to carry out some of the tasks of the center 72. The telecommunication and computer equipment (including computers) may include a network of servers coupled to both locally stored and remote databases (e.g., database 107) of any information processed.

The communications module 103 receives the transmitted tire pressure data/value and the identified haptic feedback effect(s), and identifies the wearable device 16 that is associated with the received data. The vehicle 12 is identified in the message with the tire pressure data/value the identified haptic feedback effect(s), and the communications module may identify the wearable device 16 using the vehicle's profile (stored in the database 107).

The database(s) 107 at the center 72 may be designed to store vehicle record(s), subscriber/user profile records, or any other pertinent subscriber and/or vehicle information and/or mobile communications device information. In an example, the database(s) 107 may be configured to store the user/vehicle profile, which may contain personal information of the subscriber (e.g., the subscriber's name, garage/home address, billing address, home phone number, cellular phone number, etc.), the wearable device 16 contact information, etc. It is to be understood that the databases 107 may allow the center 72 to function as a repository for data collected from the vehicle 12. In some instances, another facility may function as a repository for the collected data (e.g., a customer relationship management system (not shown) associated with the center 72 whose database(s) the communication module 103 or advisors 100, 100' can access).

A server (not shown) of the center 72 may also be in contact with the wearable device 16 and may process information requests from the wearable device 16. For example, the database 107 may store the tire pressure history of the vehicle 12, and the user of the wearable device 16 may request a tire pressure history report or a tire pressure trend report using the view 52 of the application. The server may be programmed to receive the request and respond by generating the requested report and transmitting the requested report to the cellular adapter 46 of the wearable device 16.

As illustrated in FIG. 3, the various center components are coupled to one another via a network connection or bus 109 such as one similar to the vehicle bus 66 previously described.

It is to be appreciated that the center 72 may be any central or remote facility, manned or unmanned, mobile or fixed, to or from which it is desirable to exchange voice and data communications. As such, the live advisor 100 may be physically present at the center 72 or may be located remote from the center 72 while communicating therethrough.

The center 72 shown in FIG. 3 may also be virtualized and configured in a Cloud Computer, that is, in an Internet-based computing environment. For example, the computer equipment may be accessed as a Cloud platform service, or PaaS (Platform as a Service), utilizing Cloud infrastructure rather than hosting computer equipment at the center 72. The database 107 and server may also be virtualized as a Cloud resource. The Cloud infrastructure, known as IaaS (Infrastructure as a Service), typically utilizes a platform virtualization environment as a service, which may include components such as the processor 105, database 107, and other computer equipment. In an example, the tire pressure services disclosed herein may be performed in the Cloud via the SaaS (Software as a Service).

It is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from 1 PSI to 5 PSI below the placard tire pressure value should be interpreted to include the explicitly recited limits of 1 PSI to 5 PSI below the placard tire pressure value, as well as individual values, such as 2 PSI below the placard tire pressure value, 3.5 PSI below the placard tire pressure value, 4 PSI below the placard tire pressure value, etc., and sub-ranges, such as from 1.5 PSI to 4.5 PSI below the placard tire pressure value, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A system, comprising:
a tire pressure monitoring system operatively positioned on at least one vehicle tire, the tire pressure monitoring system comprising a unique identifier associated with the at least one vehicle tire and a pressure sensing element configured to collect pressure data from the at least one vehicle tire while the vehicle is stationary during a tire inflation event;
a paired wearable device configured to be disposed outside of the vehicle during the tire inflation event;
a transceiver in the vehicle for transmitting the unique identifier and a tire pressure sensed by the pressure sensing element to the paired wearable device;
a tire pressure table stored in a model of an application having a view on the wearable device; and
a haptic feedback generator in the wearable device responsive to the tire pressure reaching a first value, wherein the first value is contained in the tire pressure table.

2. The system as defined in claim 1 wherein the wearable device is a smart watch including:
a smart watch communications platform to receive the tire pressure from the transceiver in the vehicle;
a microprocessor operatively connected to the smart watch communications platform, the microprocessor programmed to generate a haptic command signal in accordance with the first value; and
wherein the haptic generator is operatively connected to the microprocessor and has a haptic feedback function responsive to the haptic command signal.

3. The system as defined in claim 2, further comprising:
a computing device external to the smart watch and in communication with the smart watch communications platform, wherein the computing device is programmed to:
identify a haptic feedback effect linked to the first value in the tire pressure table; and
transmit the haptic feedback effect to the smart watch communications platform;
wherein the microprocessor of the smart watch is programmed to generate the haptic command signal based on the haptic feedback effect.

4. The system as defined in claim 1 wherein the haptic feedback generator is responsive to the tire pressure dynamically changing after the reaching the first value.

5. A vehicle tire gauge system, comprising:
a vehicle including:
a tire pressure monitoring system (TPMS) operatively positioned on at least one vehicle tire, the tire pressure monitoring system including:
a unique identifier associated with the at least one vehicle tire;
a pressure sensing element configured to collect tire pressure data from the at least one vehicle tire while the vehicle is stationary during a tire inflation event; and
a TPMS wireless communication platform to transmit the unique identifier and the tire pressure data; and
a vehicle communications platform to receive the tire pressure data directly or indirectly from the TPMS wireless communications platform; and
a smart watch configured to be disposed outside of the vehicle during the tire inflation event, the smart watch including:
a smart watch communications platform to receive the tire pressure data from the vehicle communications platform;
a microprocessor operatively connected to the smart watch communications platform, the microprocessor programmed to generate a haptic command signal in accordance with the received tire pressure data; and
a haptic generator operatively connected to the microprocessor, the haptic generator having a haptic feedback function responsive to the haptic command signal.

6. The vehicle tire gauge system as defined in claim 5, further comprising a computing device external to the smart watch and in communication with the smart watch communications platform, wherein the computing device includes:
a processor;
an electronic memory coupled to the processor; and
a haptic library stored on the electronic memory, the haptic library including haptic feedback effects linked to tire pressure conditions.

7. The vehicle tire gauge system as defined in claim 6 wherein:
the processor of the computing device is programmed to:
identify a tire pressure condition associated with the received tire pressure data;
identify one of the haptic feedback effects linked to the tire pressure condition; and
initiate transmission of the one of the haptic feedback effects to the smart watch communications platform; and
the microprocessor of the smart watch is to generate the haptic command signal based on the one of the haptic feedback effects.

8. The vehicle tire gauge system as defined in claim 5 wherein:
the microprocessor is programmed to dynamically generate updated haptic command signals as a tire pressure increases during the tire inflation event; and the haptic feedback function of the haptic generator is to dynamically provide updated haptic feedback effects in response to the updated haptic command signals.

9. The vehicle tire gauge system as defined in claim 8 wherein the smart watch further includes:
an electronic memory coupled to the microprocessor; and
a tire pressure application stored on the electronic memory, the tire pressure application including computer readable instructions, executable by the microprocessor, to:
launch the tire pressure application in response to a receipt of short range wireless communication data from the smart watch communications platform; and
provide a visual representation, on a display of the smart watch, of dynamically updated tire pressure data as the tire pressure of the at least one tire increases during the tire inflation event.

10. The vehicle tire gauge system as defined in claim 5 wherein the smart watch further includes:
an electronic memory coupled to the microprocessor and
a tire pressure application stored on the electronic memory, the tire pressure application including computer readable instructions, executable by the microprocessor, to:
launch the tire pressure application in response to a receipt of short range wireless communication data from the smart watch communications platform; and
provide a visual representation, on a display of the smart watch, of dynamically updated tire pressure data as the tire pressure of the at least one tire increases during the tire inflation event.

11. The vehicle tire gauge system as defined in claim 5 wherein:
the TPMS wireless communications platform includes a short range wireless technology unit; and
the smart watch communications platform includes a short range wireless technology unit and a wireless adapter.

12. The vehicle tire gauge system as defined in claim 5, further comprising a mobile device having a mobile device communication platform that is operatively connected to the vehicle communications platform to receive the tire pressure data therefrom, and the smart watch communications platform to transmit the tire pressure data thereto.

13. The vehicle tire gauge system as defined in claim 5, further comprising a server having a server communication transceiver that is operatively connected to the vehicle communications platform to receive the tire pressure data therefrom, and that is operatively connected to the smart watch communications platform to transmit the tire pressure data thereto.

14. The vehicle tire gauge system as defined in claim 5 wherein the haptic generator includes a haptic material selected from the group consisting of a piezoelectric material, a shape memory alloy, an eccentric rotating mass, and a linear resonant actuator.

15. The vehicle tire gauge system as defined in claim 5, further comprising a computing device external to the smart watch and in communication with the smart watch communications platform, wherein the computing device includes:
a processor;
an electronic memory coupled to the processor;
a placard tire pressure value for the at least one vehicle tire stored on the electronic memory; and
a haptic library stored on the electronic memory, the haptic library including a plurality of haptic feedback effects respectively linked to tire pressure values or tire pressure value ranges below the placard tire pressure value.

16. The vehicle tire gauge system as defined in claim 15 wherein:
the processor of the computing device is programmed to:
identify a tire pressure value or a tire pressure value range associated with the received tire pressure data;
identify one of the plurality of haptic feedback effects linked to the tire pressure value or the tire pressure value range; and
initiate transmission of the one of the haptic feedback effects to the smart watch communications platform; and
the microprocessor of the smart watch is to generate the haptic command signal based on the one of the plurality of haptic feedback effects.

17. A vehicle tire pressure gauge method, comprising:
while the vehicle is stationary, recognizing that a smart watch is within short range wireless communication with a tire pressure monitoring system (TPMS) operatively positioned on at least one vehicle tire;
in response to the recognizing and when the smart watch is located outside of the vehicle, launching a tire pressure application resident on an electronic memory of the smart watch;
during a tire inflation event, measuring a tire pressure with a pressure sensing element of the TPMS;
receiving, at a smart watch communications platform, the tire pressure of the at least one vehicle tire;
generating, by a microprocessor operatively connected to the smart watch communications platform, a haptic command signal in accordance with the received tire pressure;
generating, by a haptic generator operatively connected to the microprocessor, a haptic feedback effect in response to the haptic command signal.

18. The vehicle tire pressure gauge method as defined in claim 17 wherein the receiving of the tire pressure, the generating of the haptic command signal, and the generating of the haptic feedback effect occur dynamically throughout the tire inflation event, and wherein the method further comprises changing, by the haptic generator, the haptic feedback effect as the tire inflation event progresses.

19. The vehicle tire pressure gauge method as defined in claim 17, further comprising:
identifying, at a computing device external to the smart watch, a tire pressure condition associated with the tire pressure;
identifying, at the computing device, a preset haptic feedback effect that is linked to the tire pressure condition; and
transmitting the preset haptic feedback effect to the smart watch communications platform;
and wherein the generating of the haptic command signal includes generating the haptic command signal based on the preset haptic feedback effect.

20. The vehicle tire pressure gauge method as defined in claim 17, further comprising:
identifying, at a computing device external to the smart watch, a tire pressure value or a tire pressure value range associated with the tire pressure;
identifying, at the computing device, a preset haptic feedback effect that is linked to the tire pressure value or the tire pressure value range; and
transmitting the preset haptic feedback effect to the smart watch communications platform;

and wherein the generating of the haptic command signal includes generating the haptic command signal based on the preset haptic feedback effect.

21. The vehicle tire pressure gauge method as defined in claim 17, further comprising:

generating a tire pressure history report; and displaying the tire pressure history report on a display of the smart watch.

* * * * *